United States Patent
Pai et al.

(10) Patent No.: US 10,664,111 B2
(45) Date of Patent: *May 26, 2020

(54) STRUCTURE OF TRANSPARENT CAPACITIVE TOUCH SENSOR

(71) Applicants: Chih-Chiang Pai, Taoyuan (TW); Meng-Guei Lin, Taoyuan (TW); Chin-Fong Lin, Taoyuan (TW); Chiu-Wen Chen, Taoyuan (TW)

(72) Inventors: Chih-Chiang Pai, Taoyuan (TW); Meng-Guei Lin, Taoyuan (TW); Chin-Fong Lin, Taoyuan (TW); Chiu-Wen Chen, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 41 days.

This patent is subject to a terminal disclaimer.

(21) Appl. No.: 15/993,697

(22) Filed: May 31, 2018

(65) Prior Publication Data

US 2019/0369765 A1  Dec. 5, 2019

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC ....................................................... G06F 3/044
See application file for complete search history.

(56) References Cited

U.S. PATENT DOCUMENTS

| | | | |
|---|---|---|---|
| 9,626,050 B2* | 4/2017 | Bai | G06F 3/0416 |
| 2013/0215074 A1* | 8/2013 | Lin | G06F 3/044 345/174 |
| 2016/0139701 A1* | 5/2016 | Wang | G06F 3/046 345/174 |
| 2016/0179266 A1* | 6/2016 | Yang | G06F 3/044 345/174 |
| 2017/0277289 A1* | 9/2017 | Ogura | G06F 3/041 |

\* cited by examiner

*Primary Examiner* — Kent W Chang (57) ABSTRACT

A capacitive touch sensor includes two sensing layers. Each sensing layer has sensing strings, each of which is composed of sensing units connected in series. An end of each sensing string is provided with a contact. Each sensing string has a wire. Each wire electrically connects to one of the contacts and a string of the sensing units. A transparent insulative layer is arranged between the two sensing layers. The two groups of sensing strings on two the sensing layers interlace with each other to form a sensing matrix.

15 Claims, 8 Drawing Sheets

STRUCTURE OF TRANSPARENT CAPACITIVE TOUCH SENSOR

BACKGROUND OF THE INVENTION

1. Technical Field

The invention relates to touch sensors, particularly to an internal structure of a transparent capacitive touch sensor.

2. Related Art

A conventional transparent touch panel is composed of a transparent touch sensor and a transparent substrate. The touch sensor such as capacitive touch sensor has touch sensing electrodes arranged in a visible area of the touch panel and each touch sensing electrode is electrically connected to contacts or wires in a peripheral shaded area. As a result, touch signals from the touch sensing electrodes can be sent to a signal processor. As known by the public, the touch panel arranged outside a display to serve as an input device must have very good transmittance to prevent from affecting visibility of an image shown on the display. Therefore, most touch sensors are made of transparent indium tin oxide (ITO) films, on which touch sensing electrodes and their signal paths are formed. However, recent electronic products tend toward compactness and precision, so touch sensing electrodes and signal paths become tinier and tinier in size. Narrowed ITO sensing electrodes and signal paths will increase impedance to attenuate signals. It is adverse to signal transmission. Accordingly, a serious problem to large-sized touch panels is hard to be overcome.

SUMMARY OF THE INVENTION

An object of the invention is to provide an improved structure of transparent capacitive touch sensor, which offers nanometer-scaled wires with high conductivity to effectively decrease planar resistance of touch sensing strings. This can enhance sensitivity of touch operation and transmission efficiency of touch signals.

Another object of the invention is to provide a transparent capacitive touch sensor suitable for large-sized displays, whose sensing strings possess low planar resistance and high sensitivity of touch operation. It has good transmission efficiency to reduce attenuation of touch signals. This is advantageous to design of large-sized touch panels.

To accomplish the above objects, the transparent capacitive touch sensor of the invention includes a transparent first sensing layer, a transparent second sensing layer and a transparent insulative layer. The first sensing layer has first sensing strings. Each first sensing string is composed of first sensing units connected in series along a first direction. An end of each first sensing string is provided with a first contact. Each first sensing string has a first wire along the first direction. Each first wire electrically connects to one of the first contacts and a string of the first sensing units. The transparent second sensing layer has second sensing strings. Each second sensing string is composed of second sensing units connected in series along a second direction. An end of each second sensing string is provided with a second contact. Each second sensing string has a first wire along the second direction. Each second wire electrically connects to one of the second contacts and a string of the second sensing units. The transparent insulative layer is arranged between the first sensing layer and the second sensing layer to insulatively separate the two sensing layers. The first sensing strings interlace with the second sensing strings to make the first sensing units and the second sensing units be a correspondingly complementary arrangement to form a sensing matrix with a grid shape. Each of the first and second contacts is connected to a signal wire to send out touch signals from the sensing layers.

Each of the first and second sensing layers is a conductive film with transmittance and is made of metal oxide or graphene. The metal oxide is indium tin oxide, indium zinc oxide, aluminum zinc oxide or antimony tin oxide.

Electrical resistivity of each of the first and second wires is below $8\times10^{-8}$ Ω·m. Each of the first and second wire is made of gold, silver, copper, aluminum, molybdenum, nickel or an alloy thereof. A width of each of the first and second wires is less than 25 μm, preferably less than 5 μm.

DETAILED DESCRIPTION OF THE INVENTION

Please refer to FIGS. 1-5. The first embodiment of the transparent capacitive touch panel of the invention includes a base layer 10, a first sensing layer 20, an insulative layer 30, a second sensing layer 40 and a cover layer 50.

Figure 1:
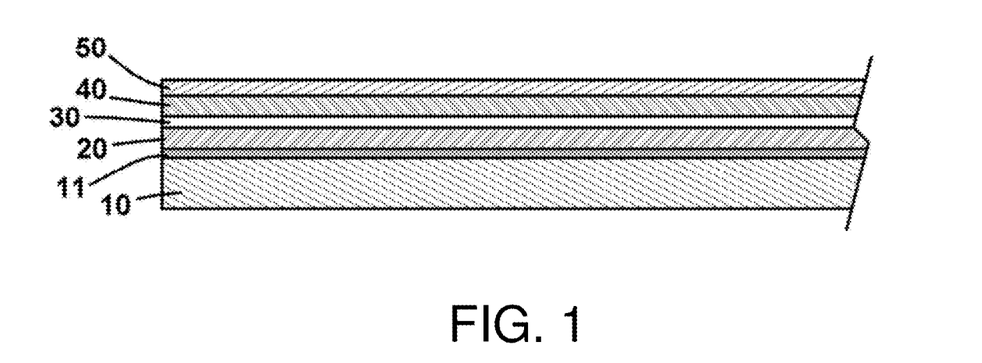
FIG. 1 is a schematic view of a laminated structure of the first embodiment of the touch sensor of the invention.
Figure 2:
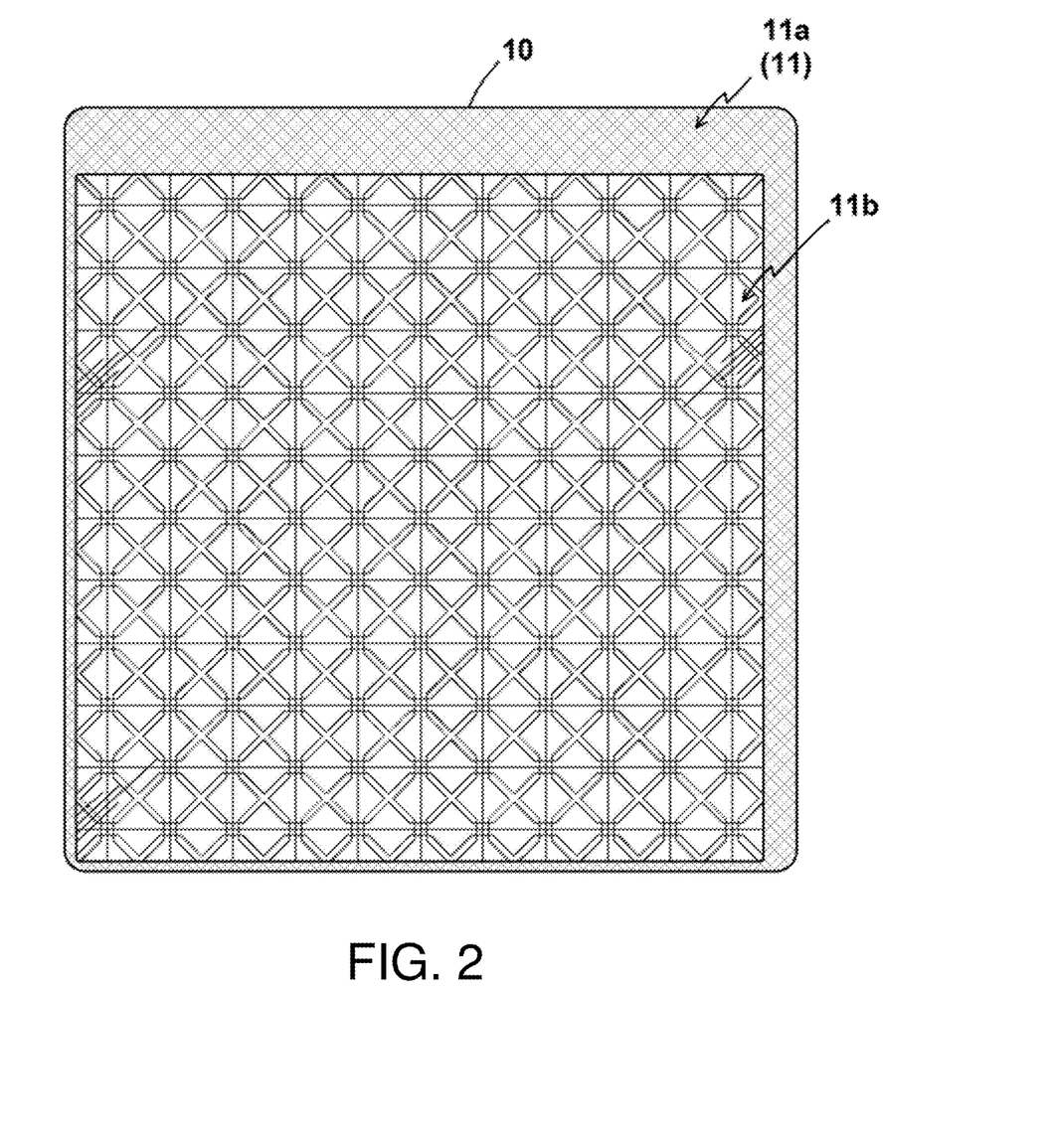
FIG. 2 is a top view of the first embodiment of the touch sensor of the invention.

The base layer 10 is a glass thin plate with great mechanical strength and high transmittance. A periphery of the base layer 10 is provided with a colored bezel 11 formed by an insulative black matrix (BM) material. The colored bezel 11 defines a shaded area 11a on the base layer 10 and a visible area 11b within the shaded area 11a.

Figure 4:
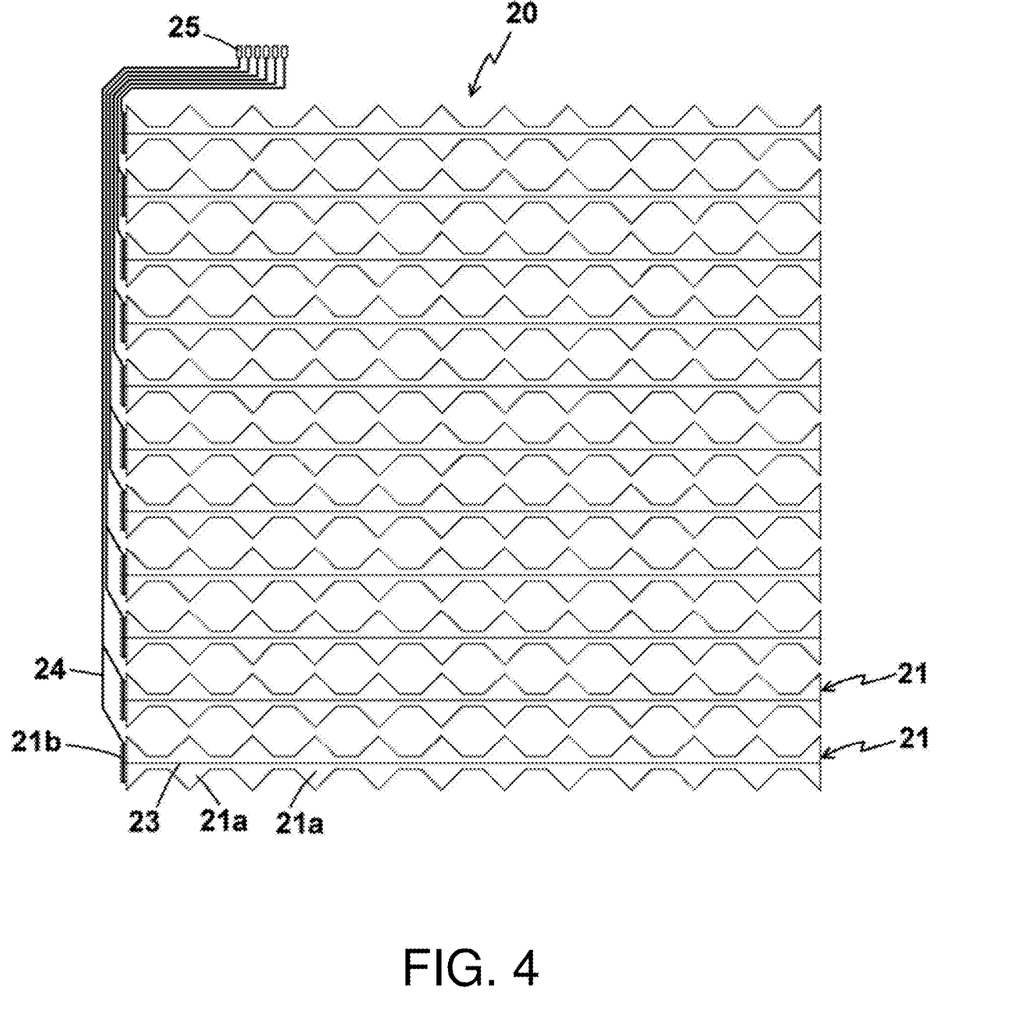
FIG. 4 is a plan view of the first sensing layer of the first embodiment of the touch sensor of the invention.

In this embodiment, the first sensing layer 20 is set to be an X-axis sensing layer. As shown in FIG. 4, the first sensing layer 20 is disposed in the visible area 11b and includes multiple rows of first sensing strings 21 (i.e., X-axis sensing strings). Each first sensing string 21 is composed of rhombic first sensing units 21a connected in series along a first direction (i.e., X-axis). An end of each first sensing string 21 is provided with a first contact 21b. Each first sensing string 21 has a first wire 23 along the first direction. Each first wire 23 electrically connects to one of the first contacts 21b and a string of the first sensing units 21a. Each first contact 21b is connected to a first signal output contact 25 through a first signal wire 24. The first signal wires 24 are located in the shaded area 11a along an edge of the base layer 10. Two ends of each first signal wire 24 are separately connected to one of the first contacts 21b and the first signal output contacts 25.

Figure 5:
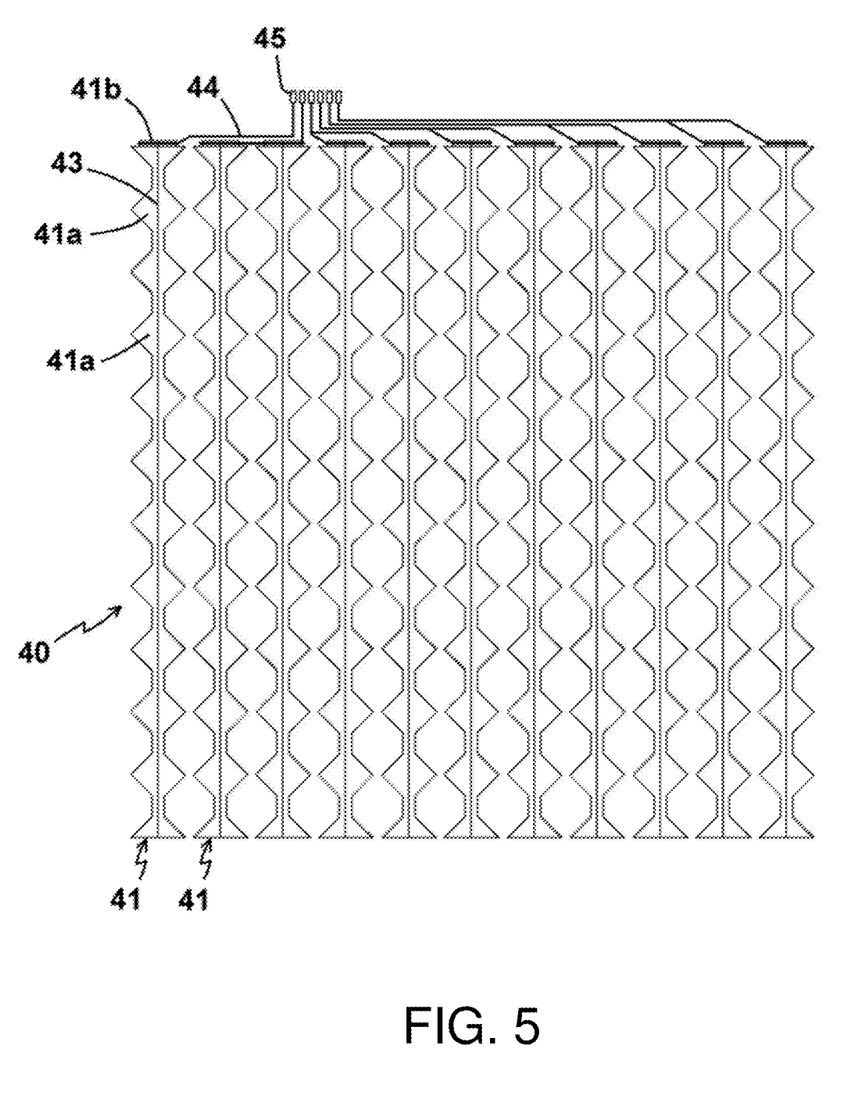
FIG. 5 is a plan view of the second sensing layer of the first embodiment of the touch sensor of the invention.

In this embodiment, the second sensing layer 40 is set to be a Y-axis sensing layer. As shown in FIG. 5, the second sensing layer 40 is disposed in the visible area 11b and includes multiple columns of second sensing strings 41 (i.e., Y-axis sensing strings). Each second sensing string 41 is composed of rhombic second sensing units 41a connected in series along a second direction (i.e., Y-axis). An end of each second sensing string 41 is provided with a second contact 41b. Each second sensing string 41 has a second wire 43 along the second direction. Each second wire 43 electrically connects to one of the second contacts 41b and a string of the second sensing units 41a. Each second contact 41b is connected to a second signal output contact 45 through a second signal wire 44. The second signal wires 44 are located in the shaded area 11a along an edge of the base layer 10. Two ends of each second signal wire 44 are separately connected to one of the second contacts 41b and the second signal output contacts 45.

The signal output contacts 25, 45 can be used for connecting a signal cable (not shown) to send touch signals to a processor (not shown).

The first and second sensing layers 20, 40 are made of transparent conductive films made of metal oxide such as indium tin oxide (ITO). The first and second wires 23, 43 adopt a material with low resistance, whose electrical resistivity is below $8\times10^{-8}$ $\Omega\cdot m$, such as copper. Because the first and second wires 23, 43 possess a lower impedance than those of the first and second sensing layers 20, 40, connecting the first and second wires 23, 43 to the first and second sensing strings 21, 41 can enhance transmission effect of touch signals and effectively reduce an impedance between the first sensing units 21a in a string and the first contact 21b connected thereto and between the second sensing units 41a in a string and the second contact 41b connected thereto to reduce attenuation in transmission of touch signals. It is noted that each of the first and second wires 23, 43 is set to be below 5 μm in width. Such a nanoscale metal wire is still invisible by the naked eye even if it is made of an opaque material, so it is suitable to be used in the visible area 11 without reducing visibility of the transparent touch sensor.

The first and second sensing layers 20, 40 are insulatively separated by the transparent insulative layer 30 and the first and second sensing units 21a, 41a separately on the two sensing layers 20, 40 are arranged correspondingly complementarily to form a rhombic grid shaped sensing matrix. The transparent insulative layer 30 may be made of optical clear adhesive (OCA) or optical clear resin (OCR) to paste the two layers 20, 40.

Additionally, the cover layer 50 is adhered on the second sensing layer 40 for protection. The cover layer 50 is an insulative film with high transmittance, such as polyethylene terephthalate (PET), Cyclo-olefin polymer (COP), poly(ethylene naphthalate (PEN), polyethylene (PE), polypropylene (PP), polyetheretherketone (PEEK), polysulfone (PSF), poly (ether sulfones) (PES), polycarbonate (PC), polyamide (PA), polyimide (PI), methyl methacrylate resin, vinyl ester resin or triacetate cellulose (TAC).

In sum, the invention utilizes connecting the first and second wires 23, 43 to the first and second sensing strings 21, 41 to reduce impedance in the transmission paths of the touch signals. As a result, not only can the quality of signal transmission of touch signals be improved, but also it is advantageous to design of large-sized touch panels. Also, thickness of the conductive film of the touch sensing layer can be reduced so that the material cost can be saved and transmittance of the touch sensing layer can be enhanced. In addition, the nanoscale first and second wires 23, 43 are substantially invisible and their occupation ratio to the whole area is below 0.3%. The light blocking rate is very low, almost all area of the touch sensing layer is light-permeable, so the transmittance is very great. Therefore, the tiny metal wires disposed in the sensing strings can effectively reduce impedance of the sensing strings and increase the efficiency of the signal transmission, but the visibility is not substantially affected.

Figure 3:
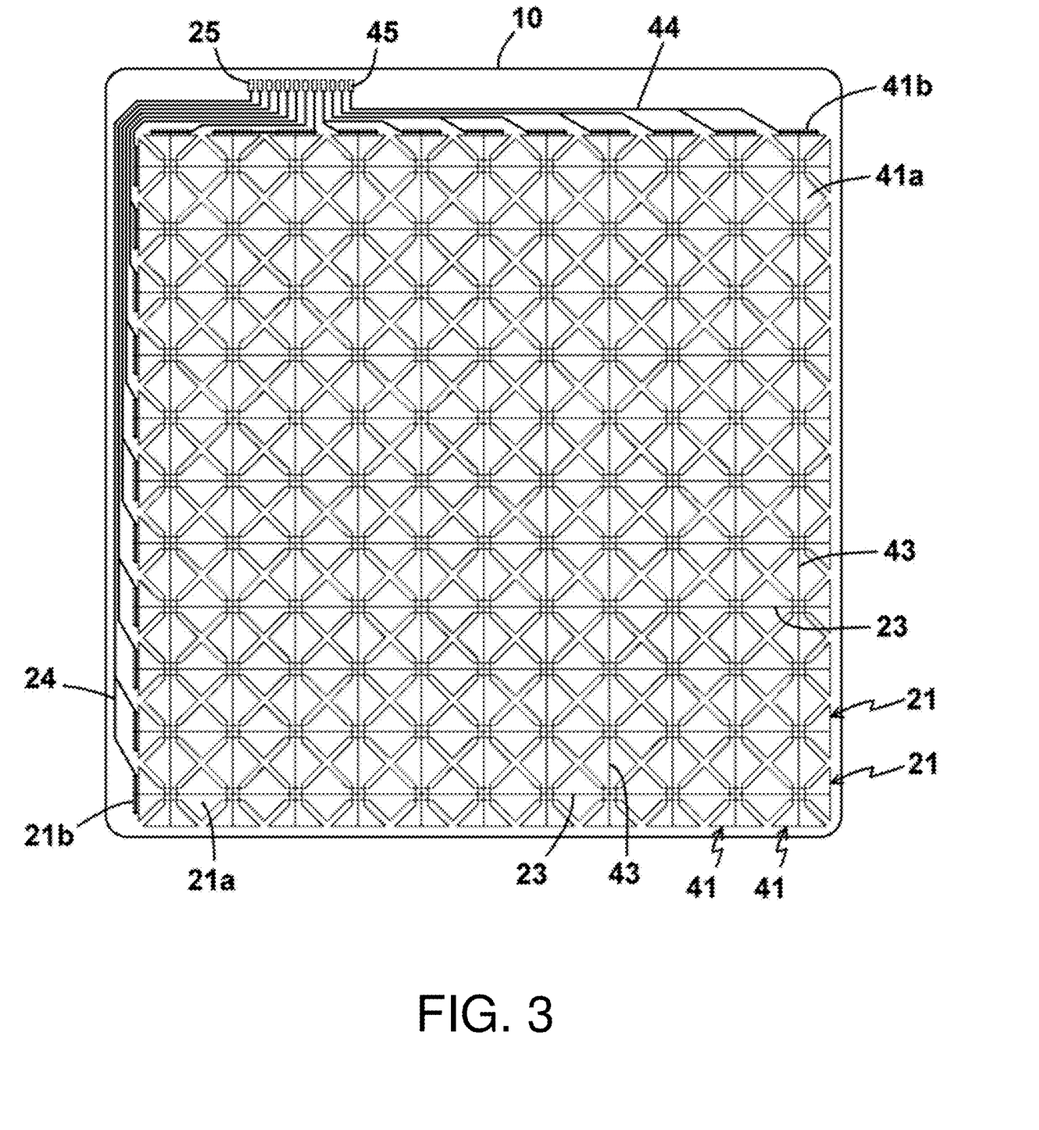
FIG. 3 is a bottom view of the first embodiment of the touch sensor of the invention.
Figure 6:
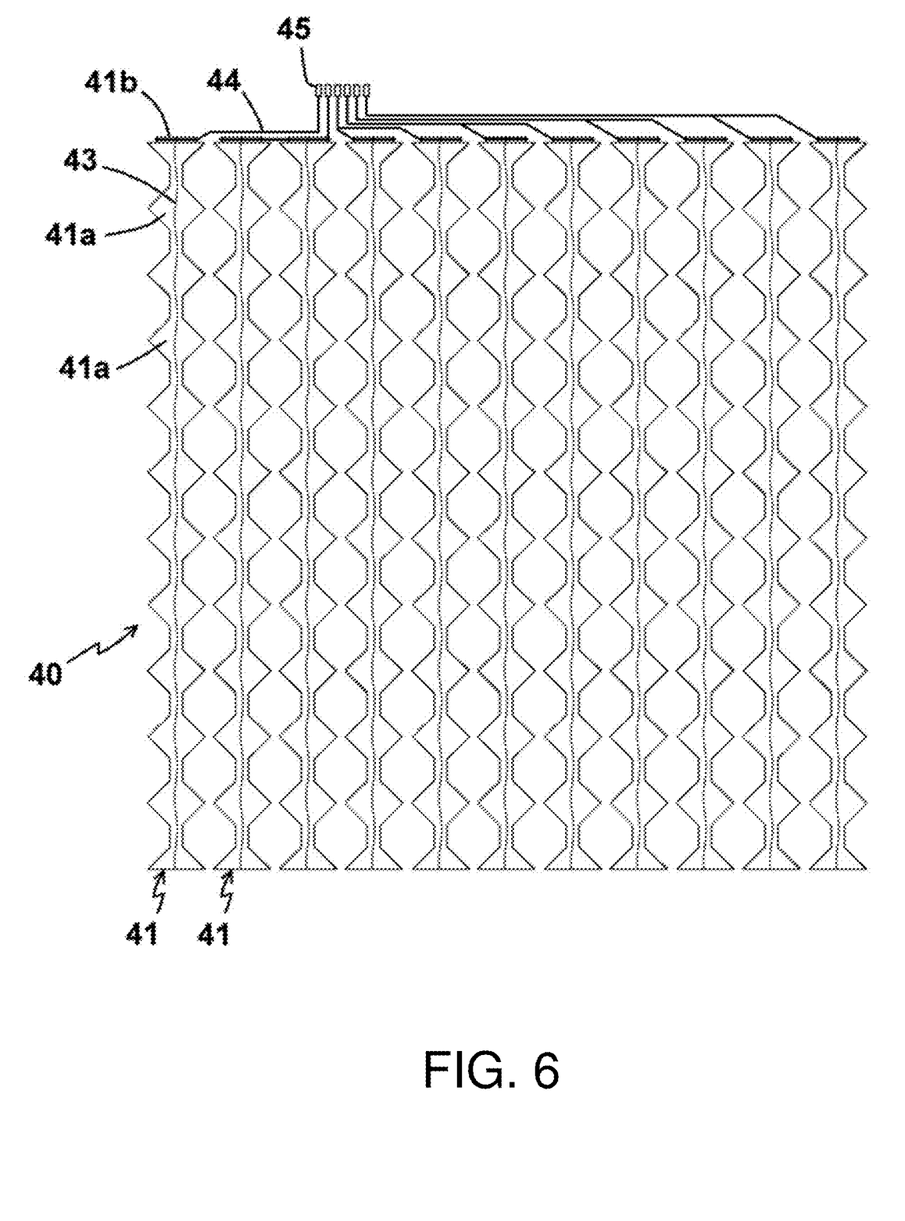
FIG. 6 is a plan view of the second sensing layer of the second embodiment of the touch sensor of the invention, which shows waved wires.

In the second embodiment shown in FIG. 6, the second wires 43 of the second sensing layer 40 are continuous waved lines. The first and second wires 23, 43 in the first embodiment shown in FIG. 3 are straight lines, but the transparent touch panel is attached outside the display, such straight metal wires may cause a moire pattern to affect image quality. Therefore, the conductive wires may be of a waved shape or other regular or irregular shapes to reduce optical interference.

Figure 7:
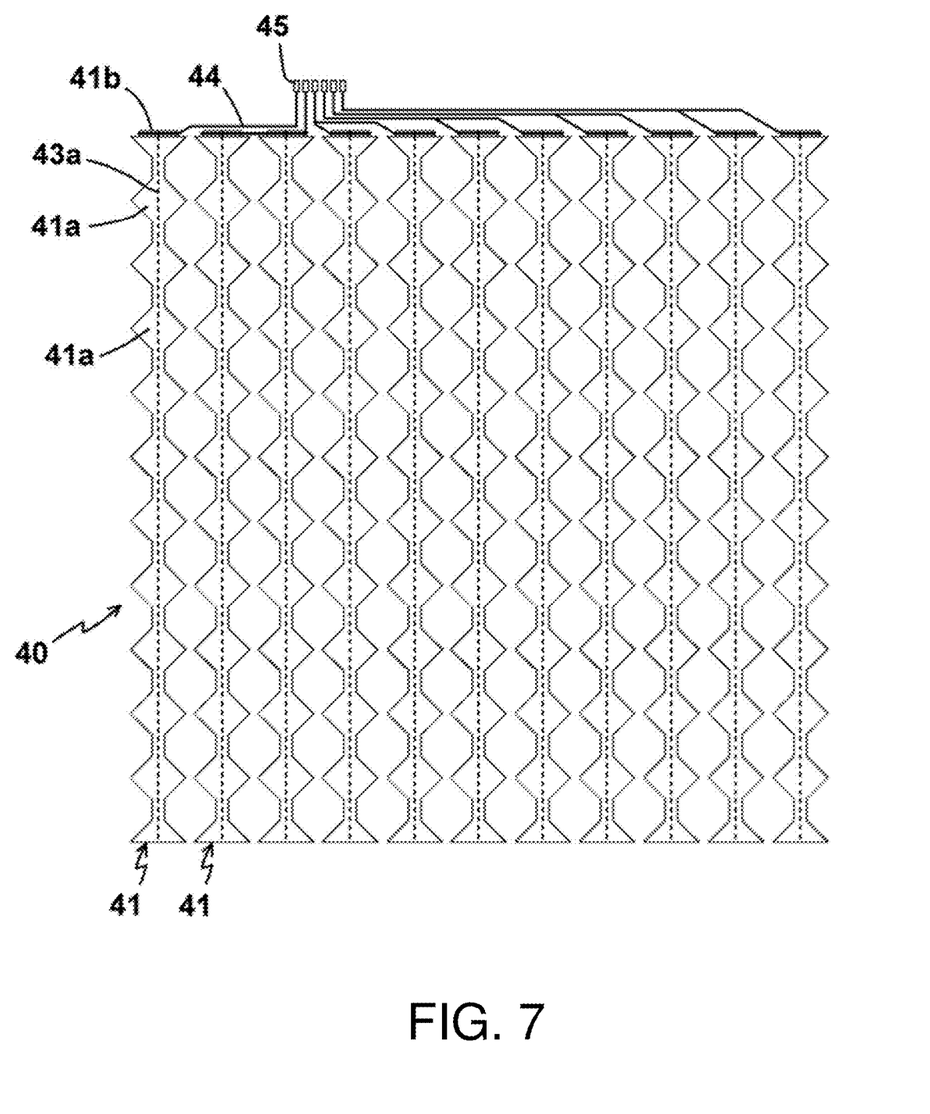
FIG. 7 is a plan view of the second sensing layer of the third embodiment of the touch sensor of the invention, which shows broken wires.

In the third embodiment shown in FIG. 7, the second wires 43a of the second sensing layer 40 are broken lines. As a result, impedance of such a broken wire 43a can be flexibly adjusted depending on actual requirements. Such a broken metal wire may also reduce optical interference and increase visibility.

Figure 8:
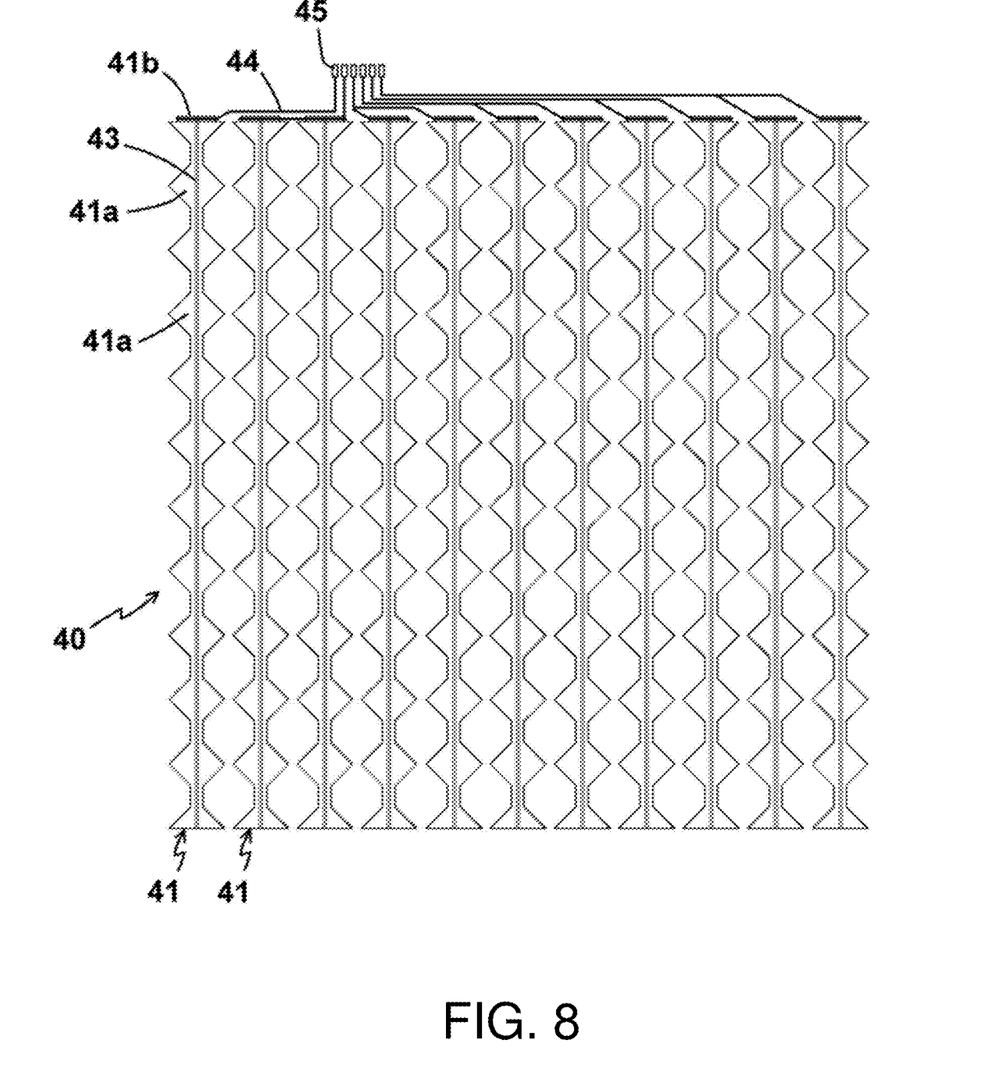
FIG. 8 is a plan view of the second sensing layer of the fourth embodiment of the touch sensor of the invention, which shows wires parallelly arranged.

The fourth embodiment shown in FIG. 8 depicts each set of second wires 43 composed of a plurality of lines parallelly arranged. This can guarantee high efficiency of signal transmission.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A transparent capacitive touch sensor comprising:
   a transparent first sensing layer, having first sensing strings, each first sensing string being composed of a pair of first string lines, each first string line having half first sensing units connected in series along a first direction, corresponding two of the half first sensing units in each pair of first string lines forming a first sensing unit, an end of each first sensing string being provided with a first contact, each first sensing string having a first wire between the pair of the first string lines and along the first direction, and each first wire electrically connecting to one of the first contacts and a string of the first sensing units;
   a transparent second sensing layer, having second sensing strings, each second sensing string being composed of a pair of second string lines, each second string line having half second sensing units connected in series along a second direction, corresponding two of the half second sensing units in each pair of second string lines forming a second sensing unit, an end of each second sensing string being provided with a second contact, each second sensing string having a second wire between the pair of the first string lines and along the second direction, and each second wire electrically connecting to one of the second contacts and a string of the second sensing units; and
   a transparent insulative layer arranged between the first sensing layer and the second sensing layer to insulatively separate the two sensing layers;

wherein each of the first and second wires has a lower impedance than each of the first and second sensing layers, and the first sensing strings interlace with the second sensing strings to make the first sensing units and the second sensing units be a correspondingly complementary arrangement to form a sensing matrix with a grid shape.

2. The transparent capacitive touch sensor of claim 1, wherein each of the first and second sensing layers is made of metal oxide or graphene.

3. The transparent capacitive touch sensor of claim 2, wherein the metal oxide is indium tin oxide, indium zinc oxide, aluminum zinc oxide or antimony tin oxide.

4. The transparent capacitive touch sensor of claim 1, wherein electrical resistivity of each of the first and second wires is below $8 \times 10\text{-}8$ Ω·m.

5. The transparent capacitive touch sensor of claim 4, wherein each of the first and second wires is made of gold, silver, copper, aluminum, molybdenum, nickel or an alloy thereof.

6. The transparent capacitive touch sensor of claim 1, wherein a width of each of the first and second wires is less than 25μm.

7. The transparent capacitive touch sensor of claim 6, wherein the width is less than 5μm.

8. The transparent capacitive touch sensor of claim 1, wherein each of the first and second wires is a continuously straight or waved line.

9. The transparent capacitive touch sensor of claim 1, wherein each of the first and second wires is a broken line.

10. The transparent capacitive touch sensor of claim 1, wherein each of the first and second wires is composed of two or more parallel lines.

11. The transparent capacitive touch sensor of claim 1, wherein the transparent insulative layer is made of optical clear adhesive (OCA) or optical clear resin (OCR).

12. The transparent capacitive touch sensor of claim 1, wherein the first direction is perpendicular to the second direction.

13. The transparent capacitive touch sensor of claim 1, wherein each first wire is isolated between the pair of the pair of the first string lines at intervals.

14. The transparent capacitive touch sensor of claim 13, wherein each first wire is isolated between the pair of the pair of the first string lines at identical intervals.

15. The transparent capacitive touch sensor of claim 13, wherein each of the half first sensing units and the half second sensing units is an isosceles angle.

* * * * *